United States Patent [19]

Nakanishi et al.

[11] Patent Number: 5,187,599
[45] Date of Patent: Feb. 16, 1993

[54] DISPLAY INCLUDING TWO MICROLENS ARRAYS WITH UNEQUAL FOCAL LENGTHS AND CONGRUENT FOCAL POINTS

[75] Inventors: Hiroshi Nakanishi, Tenri; Hioroshi Hamada, Nara, both of Japan

[73] Assignee: Sharp Kabushiki Kaisha, Osaka, Japan

[21] Appl. No.: 647,635

[22] Filed: Jan. 31, 1991

[30] Foreign Application Priority Data

Feb. 1, 1990 [JP] Japan .................................. 2-22824
Oct. 9, 1990 [JP] Japan .................................. 2-271898

[51] Int. Cl.$^5$ .......................................... G02F 1/1335
[52] U.S. Cl. ..................................................... 359/41
[58] Field of Search ............. 350/331 R, 334; 359/40, 359/41

[56] References Cited

U.S. PATENT DOCUMENTS

| 4,836,652 | 6/1989 | Oishi et al. ........................... 350/334 |
| 4,945,348 | 7/1990 | Ibamoto et al. .................... 359/40 X |
| 5,052,783 | 10/1991 | Hamada ............................ 359/41 X |
| 5,056,912 | 10/1991 | Hamada et al. ....................... 353/38 |

FOREIGN PATENT DOCUMENTS

| 60-177788 | 9/1985 | Japan . |
| 60-262131 | 12/1985 | Japan ..................................... 359/41 |
| 61-11788 | 1/1986 | Japan . |
| 63-253327 | 10/1988 | Japan ..................................... 359/40 |
| 1-187502 | 7/1989 | Japan . |
| 1-251754 | 10/1989 | Japan . |
| 1-265228 | 10/1989 | Japan . |
| 2-001816 | 1/1990 | Japan . |
| 2-12224 | 1/1990 | Japan . |
| 2-89025 | 3/1990 | Japan ..................................... 359/41 |
| 2-115889 | 4/1990 | Japan . |

Primary Examiner—William L. Sikes
Assistant Examiner—Ron Trice
Attorney, Agent, or Firm—Nixon & Vanderhye

[57] ABSTRACT

A transmissive display device which includes a display panel having multiple picture elements (5), a first array of microlenses (1) disposed on the incident side of the display panel, the microlenses each being disposed in correspondence to respective picture elements, a second array of microlenses (2) disposed on the outlet side of the display panel, the mcirolenses each being disposed in correspondence to respective picture elements, wherein the positions of the focal points of the first array of microlenses are identical with the positions of the focal points of the second array of microlenses, and wherein the focal length of each microlens in the first array is larger than that of each microlens in the second array.

9 Claims, 2 Drawing Sheets

DISPLAY INCLUDING TWO MICROLENS ARRAYS WITH UNEQUAL FOCAL LENGTHS AND CONGRUENT FOCAL POINTS

BACKGROUND OF THE INVENTION

1. Field of the Invention

The present invention relates generally to a transmissive-type display device (hereinafter called "transmissive display device"), and more particularly to a dot-matrix type display device having a display panel such as a liquid crystal panel and multiple picture elements arranged in a matrix, wherein the display panel is provided with an array of microlenses. This type of display device is particularly applicable to a large-screen projection TV, information display systems and the like.

2. Description of the Prior Art

In the transmissive display panels, non-linear devices such as varisters or MIM (metal insulator metal) are provided in correspondence to the picture elements so as to prevent possible cross talk between the adjacent picture elements. Switching elements such as TFTs (Thin Film Transistor) disposed for the respective picture elements drive picture element their electrodes. These elements and wiring thereto occupy a space in the display device, thereby reducing the effective area for forming picture elements. This reduces the numerical aperture of the display device. The numerical aperture ratio is expressed by (the effective area of all the picture elements) divided by (total display area).

As is evident from the formula, as the areas which do not contribute to displaying increases, the numerical aperture ratio decreases. The reduced numerical aperture ratio leads to the reproduction of dark picture, and the poor image quality.

In order to refine pictures on display, another requirement is to minimize the picture elements on the display panel. If the sizes of the components of all the picture elements are proportionally reduced, the numerical aperture ratio will not change. However, photolithograph and etching has a limit to the minimizing of the non-linear elements and switching elements, and the wiring thereto cannot be made narrow in its width below an allowable extent. As the spaces are occupied by these elements, the numerical aperture ratio of the display device is reduced.

The numerical aperture ratio is the ratio of incident rays to the display panel to a recoverable light. Unrecoverable light is shut out by an untransmissive portion of the display panel, and does not contribute to displaying. Consequently, the quality of pictures on display depends on the numerical aperture ratio of the display devices when they employ the same source of light; that is, the reduced numerical aperture ratio leads to the reproduction of a dark picture.

To solve the problems pointed out above, one proposal is for providing the display panel with an array of microlenses on one side or on both sides thereof, which are disclosed in Japanese Laid-Open Patent Publications No. 60-262131 and No. 61-11788. An advantage of these known display devices is that the incident rays to the portions of display panel that do not contribute to displaying are focused on the picture elements in the display panel, thereby increasing the numerical aperture substantially.

However, these known display devices have the following disadvantages:

In a display device whose display panel has an array of microlenses only on the light-incident side, that is, the side where light enters the display panel, after the rays are focused on the picture elements, they are diverged. To use this display panel in a projection type display device, it is required that the numerical aperture (NA) of the projection lens on the light-outlet side is deliberately enlarged.

In a display device whose display panel has arrays of microlenses on both sides, the following problems arise:

Referring to FIG. 3, a typical conventional display panel will be described in detail:

The display panel 3 has microlenses 1 and 2 on both sides. The microlenses 1 and 2 are arranged such that their focal lengths are the same. In addition, the focal points of the microlenses 1 on the light-incident side of the display panel 3 and the microlenses 2 on the light-outlet side thereof correspond to each other. As a result, the focal points of these microlenses 1 and 2 are disposed in the cross-sectional center of the display panel 3. The incident parallel rays of the microlens 1 to the light-incident side of the display panel 3 are focused on the focal points, and thereafter tend to be diverged. However, they are changed into parallel rays by passing through the microlenses 2.

The state shown in FIG. 3 is a hypothetical situation only achievable if idealistic microlenses are produced. However, the reality is that some of the incident rays do not pass through the respective microlenses 2 but pass through other microlenses due to the aberration of them. As a result, the outlet rays are diverged at angles widened by the microlenses through which they pass, as shown by the dotted lines in FIG. 3. This diversion results in the loss of light. In the case of a projection type display device, a relatively large numerical aperture will be required for the projection lens so as to prevent the light from being lost.

SUMMARY OF THE INVENTION

The transmissive display device of this invention, which overcomes the above-discussed and numerous other disadvantages and deficiencies of the prior art, comprises a display panel having multiple picture elements, a first array of microlenses disposed on the incident side of the display panel, the microlenses each being disposed in correspondence to respective picture elements, a second array of microlenses disposed on the outlet side of the display panel, the microlenses each being disposed in correspondence to respective picture elements, wherein the positions of the focal points of the first array of microlenses are identical with those of the focal points of the second array of microlenses, and wherein the focal length of each microlens in the first array is larger than that of each microlens in the second array.

In a preferred embodiment, the picture elements are provided in the cross-sectional center of the display panel.

In a preferred embodiment, the picture elements are disposed at the focal points of the first array of microlenses.

In a preferred embodiment, each of the first and second microlenses has a gradient refractive index.

In a preferred embodiment, the display panel is a liquid crystal panel.

Thus, the invention described herein makes possible the objective of providing a transmissive display device capable of reproducing a clear picture irrespective of its relatively small numerical aperture.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
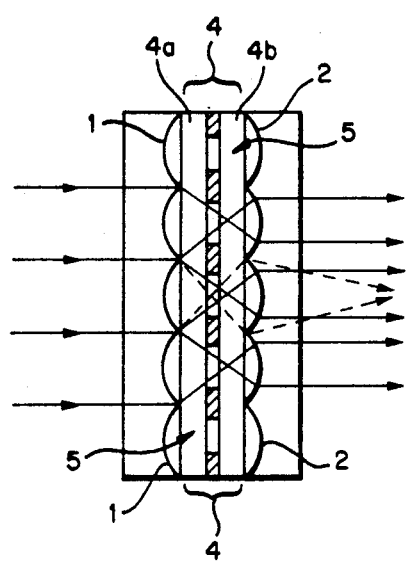
FIG. 1 is a diagrammatic cross-section showing a display device according to the present invention.
Figure 2:
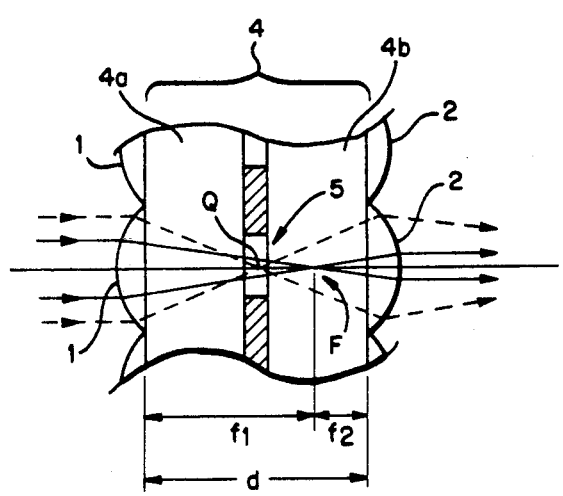
FIG. 2 is a fragmentary cross-section on an enlarged scale showing the relationship between the microlenses and the display panel.

Referring to FIGS. 1 and 2, the present invention will be described by reference to a projection type display employing a liquid crystal display panel 4 in which picture elements are formed at a ratio of a few picture elements per 10 mm. The numerical aperture ratio of the display panel is 50% to 80%. The incident side of the display panel 4 toward the light source has a first array of microlenses 1, and the outlet side thereof has a second array of microlenses 2. The display panel 4 has multiple picture ture elements 5 arranged in a matrix. The microlenses 1 and 2 are individually disposed in correspondence to each picture element 5, thereby ensuring that the microlenses 1 and 2 are arranged face to face with each other, with one picture element being interposed therebetween. In the illustrated embodiment, the microlenses 1 and 2 are fabricated with two-dimensionally arranged multiple lenses each having a gradient refractive index.

The substrates 4a and 4b constituting the liquid crystal display panel 4 are 1.1 mm thick. The thickness of the picture elements 5 is negligible. The liquid crystal display panel 4 has a thickness (d) of 2.2 mm. The focal length $f_1$ of each microlens 1 is 1200 μm, and the focal length $f_2$ of each microlens 2 is 1000 μm. Therefore, the thickness d of the liquid crystal display panel 4 is the sum of the focal lengths $f_1$ and $f_2$ becomes 2200 μm. Thus, the focal points of the first array of microlens 1 and those of the second microlens 2 become identical toward the liquid crystal panel.

In the illustrated display device, parallel rays passing near the optical axes of the microlenses 1 and 2 are focused at a focus F at a distance of $f_1$ away from the surface of the liquid crystal display panel 4, as indicated by the full lines in FIG. 2. Thereafter, the rays, while diverging, reach the second array of microlenses 2 whereby they are converted into parallel rays. When the parallel rays are to pass through the peripheral portion of each microlens 1, they pass through a point Q toward the first array of microlenses 1 rather than the focal point F thereof owing to the aberration of the microlens 1, as indicated by dotted lines in FIG. 2. Since the point Q is disposed toward the light outlet side of the liquid crystal display panel 4 beyond the sectional center of the picture element 5, the rays can enter the second microlens 2. Since the distance between the point Q and the microlens 2 is larger than the focal length $f_2$ of the microlens 2, the rays passing through the microlens 2 cannot become parallel rays. Advantageously, these rays contribute to displaying, thereby avoiding the loss of light. Thus, the liquid crystal display device eliminates the necessity of employing a large projection lens, and allows the reproduction of a clean image with the employment of a projection lens having a relatively small diameter.

Figure 4:
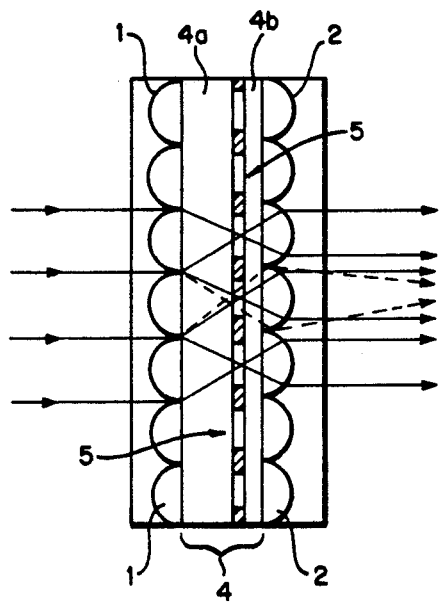
FIG. 4 is a diagrammatic cross-section showing another example of a display device according to the present invention.
Figure 5:
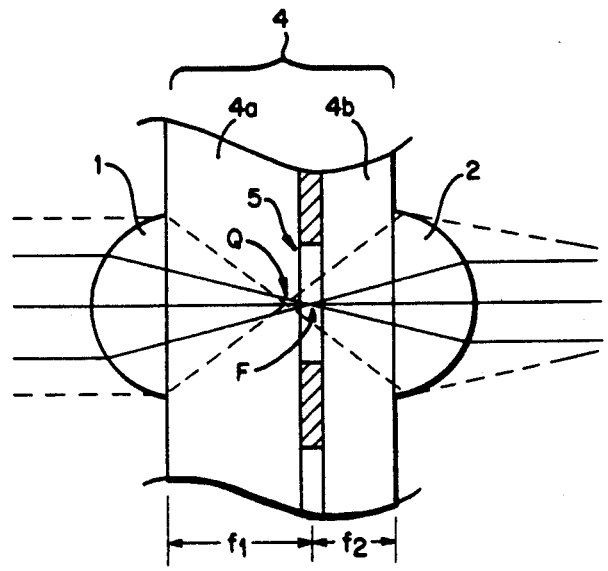
FIG. 5 is a fragmentary cross-section on an enlarged scale showing the relationship between the microlenses and the display panel in the display device of FIG. 4.

Referring to FIGS. 4 and 5, wherein like numerals designate similar members and elements to those in FIGS. 1 and 2, the microlenses 1 and 2, produced by an ion exchange method, has a gradient refractive index. The focal length $f_1$ of the first microlens 1 is 1100 μm, and the focal length $f_2$ is 700 μm. A pair of substrates 4a and 4b constituting the liquid crystal panel 4 are respectively 1.1 mm and 0.7 mm thick. The thickness of the substrates 4a and 4b are equal to the focal lengths $f_1$ and $f_2$ of the microlenses 1 and 2. The focal points of the first microlens 1 and those of the second microlens 2 become identical with each other toward the liquid crystal panel. In this way, each picture element 5 formed between the substrates 4a and 4b is disposed at the focal point of the microlens 1 toward the liquid crystal display panel 4, which means that it is disposed at the focal point of the microlens 2 toward the liquid crystal display panel 4.

Parallel rays passing near the optical axes of the microlenses 1 and 2 are focused at a focal point F on the picture element 5 of the liquid crystal display panel 4, as indicated by the full lines in FIG. 5. Thereafter, the rays, while diverging, reach the second microlens 2 whereby they are converted into parallel rays. When the parallel rays are to pass through the peripheral portion of the microlens 1, they pass through a point Q nearer the microlens 1 than the focal point F thereof owing to the aberration of the microlens 1, as indicated by dotted lines in FIG. 5. This point Q is disposed nearer the light outlet side of the display panel than in the conventional display device shown in FIG. 3, thereby allowing the rays to enter the microlens 2. Since the distance between the point Q and the microlens 2 is larger than the focal length $f_2$, the rays passing through the microlens 2 do not become parallel rays. Advantageously, these rays converge and contribute to displaying, thereby reducing the loss of light rays.

Figure 3:
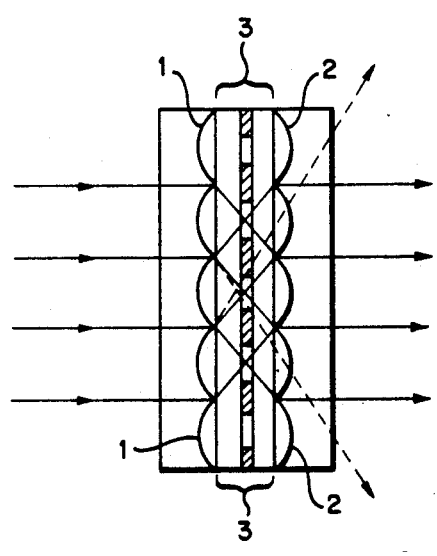
FIG. 3 is a diagrammatic cross-section showing a conventional display device.

In this example, the focal points of the microlenses 1 and 2 are situated on the picture element 5, thereby reducing the amount of rays which are shut out by other portions than the picture element 5 as compared with the conventional device shown in FIG. 3. Thus, a clear image is displayed.

As referred to above, the microlenses 1 and 2 are fabricated by an ion exchange method, but they can be made by a swelling method, a heating method or a mechanical method. In the swelling method, photosensitive monomer is polymerized by ultraviolet ray, and then an exposed portion is swollen into lenses by the osmotic pressure between the exposed portion and the non-exposed portion. In the heating method, after a photosensitive resin is patterned in circles, it is heated at a higher temperature than its melting point, and the resulting molten resin is formed into lenses under surface tension. In the mechanical method, a raw material is mechanically cut into lenses.

The materials usable for fabricating the microlenses can be clear resins such as acrylic resin, polycarbonate resin, polystyrene resin, glass or the like.

Figure 6:
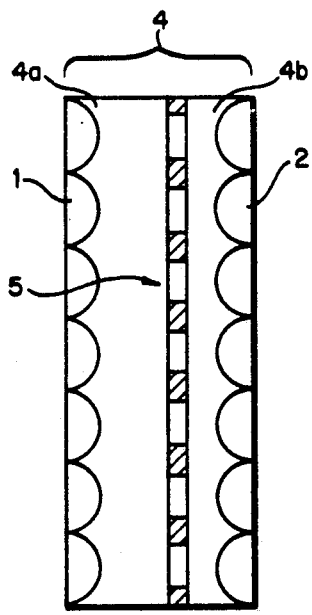
FIGS. 6 and 7 are diagrammatic cross-sections showing further examples of display devices.
Figure 7:
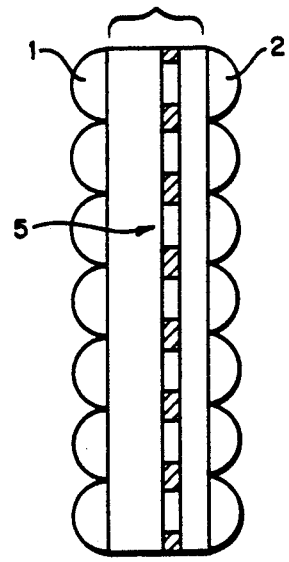

The microlenses can be plano-convex or double convex. In the illustrated embodiments, the flat surfaces of the microlenses are faced to the liquid crystal display panel 4, but the convex surfaces thereof can be faced thereto. As an alternative method, it is possible to fabricate the substrates 4a and 4b, and the microlenses 1 and 2 in one piece whether they may be within the panel (as shown in FIG. 6) or on the panel (as shown in FIG. 7).

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A transmissive display device comprising a first substrate and a second substrate both constituting a display panel having multiple picture elements, a first array of microlens disposed on an incident side of one of the substrates, the first array of microlenses each being disposed in correspondence to respective picture elements, a second array of microlenses disposed on an outlet side of the other substrate, the second array of microlenses each being disposed in correspondence to respective picture elements, wherein the positions of the focal points of the first array of microlenses are identical with those of the focal points of the second array of microlenses, and wherein the focal length $f_1$ of each microlens in the first array is larger than the focal length $f_2$ of each microlens in the second array.

2. A transmissive display device according to claim 1, wherein the picture elements are provided in the cross-sectional center of the display panel.

3. A transmissive display device according to claim 1, wherein the picture elements are disposed at the focal points of the first array of microlenses.

4. A transmissive display device according to claims 1, 2 or 3, wherein each of the first and second microlenses has a gradient refractive index.

5. A transmissive display device according to claim 1, wherein the display panel is a liquid crystal panel.

6. A transmissive display device according to claim 1, wherein the focal length of each microlens is substantially the same as the thickness of the substrate with which it is disposed, and whereby convergent light from the first array of microlenses passes through apertures of the respective picture elements.

7. A transmissive display device comprising:
a liquid crystal display panel having a plurality of picture elements formed therein;
first and second substrates provided respectively on first and second sides of the liquid crystal display panel, the first side of the liquid crystal display panel being an incident side;
a first array of microlenses provided on the first substrate, each microlens being disposed with respect to a corresponding picture element;
a second array of microlenses provided on the second substrate, each microlens being disposed with respect to a corresponding picture element;
wherein, for each picture element, a focal point of the corresponding microlens in the first array is at the same position as a focal point of the corresponding microlens in the second array, with a focal length $f_1$ of each microlens in the first array being greater than a focal length $f_2$ of each microlens in the second array, whereby all incident rays through a microlens in the first array can pass through the corresponding microlens in the second array irrespective of aberration occurring on a periphery portion of the microlens in the first array.

8. A transmissive display device according to claim 1, wherein a microlens in the first array is so formed that light subject to focal aberrations from peripheral portions thereof converges at a convergence point between the first array and the second array and is incident upon a microlens in the second array in a manner whereby the light exiting the microlens in the second array does not diverge from a principal optical axis extending between the microlens in the first array and the microlens in the second array.

9. A transmissive display device according to claim 8, wherein the convergence point is located between the first array and the second array and is at a greater distance from the second array than the focal length $f_2$.

* * * * *

UNITED STATES PATENT AND TRADEMARK OFFICE
CERTIFICATE OF CORRECTION

PATENT NO. : 5,187,599

DATED : February 16, 1993

INVENTOR(S) : Hiroshi Nakanishi and Hiroshi Hamada

It is certified that error appears in the above-identified patent and that said Letters Patent is hereby corrected as shown below:

On title page, item, [75] Inventor's name "Hioroshi Hamada" should be corrected to read --Hiroshi Hamada--.

Col. 5, line 32, "microlens" should be --microlenses--.

Col. 5, line 42, "those" should read --the positions--.

Signed and Sealed this

Twenty-sixth Day of July, 1994

*Attest:*

BRUCE LEHMAN

*Attesting Officer*    *Commissioner of Patents and Trademarks*